(12) United States Patent  
Kuismanen

(10) Patent No.: US 12,521,461 B2
(45) Date of Patent: Jan. 13, 2026

(54) HYDROGEN PEROXIDE VAPORIZER ARRANGEMENT IN A DISINFECTING DEVICE

(71) Applicant: OY PRO-HYDRO AB, Tornio (FI)

(72) Inventor: Aki-Antti Kuismanen, Porvoo (FI)

(73) Assignee: OY PRO-HYDRO AB, Tornio (FI)

( * ) Notice: Subject to any disclaimer, the term of this patent is extended or adjusted under 35 U.S.C. 154(b) by 467 days.

(21) Appl. No.: 18/005,023

(22) PCT Filed: Jun. 17, 2021

(86) PCT No.: PCT/FI2021/050465
§ 371 (c)(1),
(2) Date: Jan. 10, 2023

(87) PCT Pub. No.: WO2022/008789
PCT Pub. Date: Jan. 13, 2022

(65) Prior Publication Data
US 2023/0233727 A1     Jul. 27, 2023

(30) Foreign Application Priority Data

Jul. 10, 2020   (FI) ...................................... 20205750

(51) Int. Cl.
*A61L 9/00*   (2006.01)
*A61L 2/18*   (2006.01)
*A61L 9/03*   (2006.01)

(52) U.S. Cl.
CPC .............. *A61L 9/032* (2013.01); *A61L 2/186* (2013.01); *A61L 2202/14* (2013.01); *A61L 2202/25* (2013.01)

(58) Field of Classification Search
CPC .................................. A61L 2/20; A61L 2/208
(Continued)

(56) References Cited

U.S. PATENT DOCUMENTS 7,713,473 B2    5/2010 Kendall
2005/0095168 A1  5/2005 Centanni et al.
(Continued)

FOREIGN PATENT DOCUMENTS

DE    102017215200 A1   2/2019
EP         1738777 A2   1/2007
(Continued)

OTHER PUBLICATIONS

International Search Report and Written Opinion received for PCT Serial No. PCT/FI2021/050465 on Nov. 3, 2021, 10 pgs.
(Continued)

*Primary Examiner* — Monzer R Chorbaji
(74) *Attorney, Agent, or Firm* — Merchant & Gould P.C.

(57) ABSTRACT

An improved vaporizer part, such as an evaporator element of a disinfection device is for an aqueous solution of hydrogen peroxide. The evaporator element includes one, and/or a branching, meandering structure, in which the straight sections of the groove are joined by 180-degree meanders near edges of the evaporator element. An end pit with an overflow guard is for overflown liquid. Heating elements are used both in connection with the evaporator element to enhance evaporation and on the inner surfaces of the device to prevent condensation. An air blower creates desired vortices near the surface of the evaporator element. The air control element also makes the air flow more laminar. The actual travel of the liquid on the evaporator element functions gravitationally on an inclined surface, and the capillary effect increases the evaporating area of the liquid. A disinfection device includes the vaporizer part.

21 Claims, 3 Drawing Sheets

Figure 1:
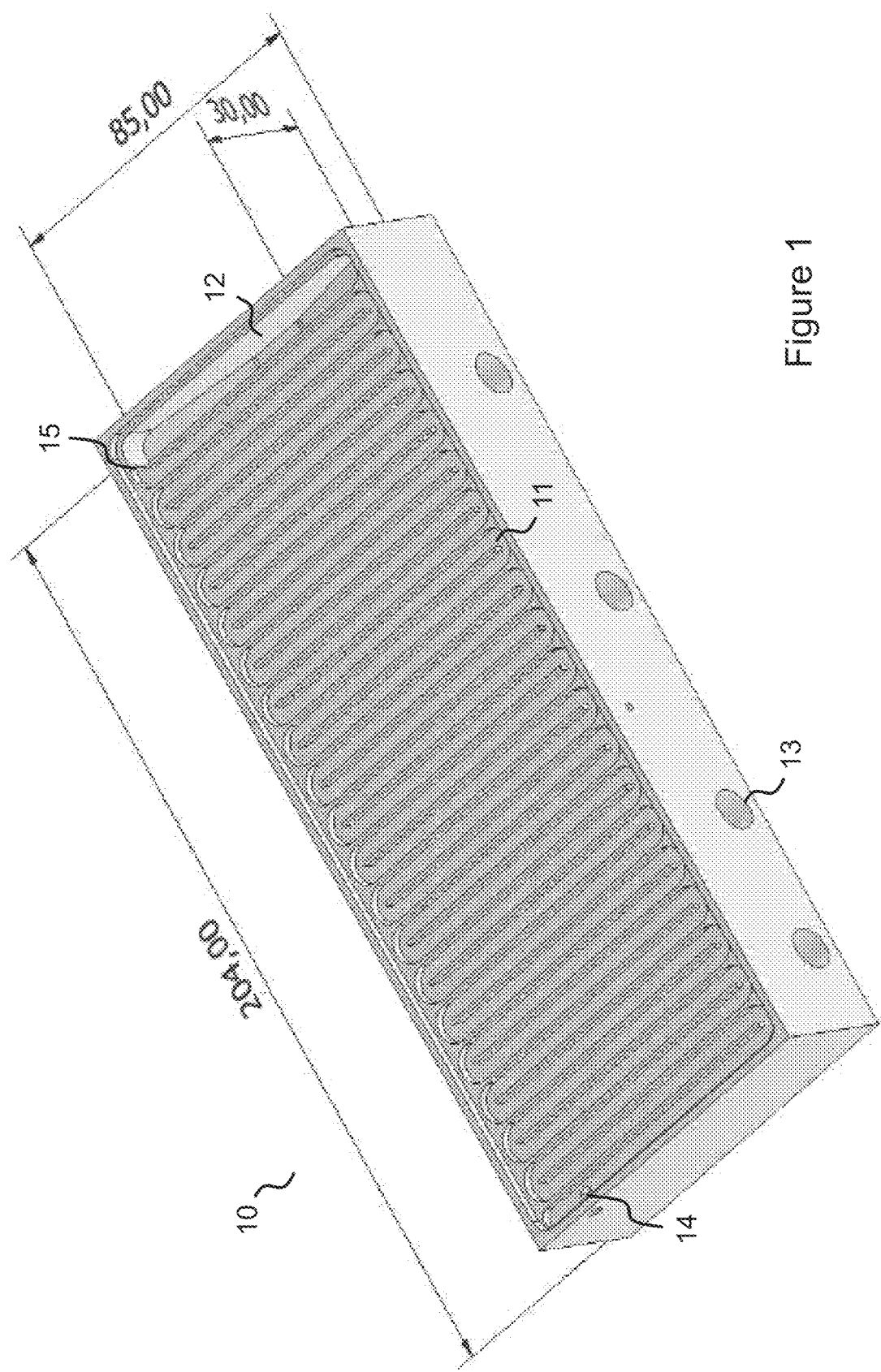

(58) Field of Classification Search
USPC .......................................................... 422/307
See application file for complete search history.

(56) References Cited

U.S. PATENT DOCUMENTS

2008/0038166 A1    2/2008  Hill et al.
2012/0258023 A1*  10/2012  Von Stenglin .......... A61L 2/208
                                                422/307

FOREIGN PATENT DOCUMENTS

| FI | 20187118 A1 | 5/2020 |
| JP | 2016221078 A | 12/2016 |
| JP | 2019536486 A | 12/2019 |
| KR | 10-2013-0082075 A | 7/2013 |
| WO | 2020049220 A1 | 3/2020 |

OTHER PUBLICATIONS

Korean Notice of Allowance received for KR Application No. 10-2023-7004939 on Jun. 17, 2025, 5 pgs.

* cited by examiner

HYDROGEN PEROXIDE VAPORIZER ARRANGEMENT IN A DISINFECTING DEVICE

CROSS-REFERENCE TO RELATED APPLICATION(S)

This application is a National Stage Application of PCT/FI2021/050465, filed 17 Jun. 2021, which claims benefit of Ser. No. 20/205,750, filed 10 Jul. 2020 in Finland, and which applications are incorporated herein by reference. To the extent appropriate, a claim of priority is made to each of the above disclosed applications.

FIELD OF THE INVENTION

The invention relates to the microbiological decontamination of enclosed spaces, i.e. removing bacteria and viruses from a space by using appropriate decontamination equipment, and hydrogen peroxide as the decontaminating chemical agent.

BACKGROUND OF THE INVENTION

To disinfect different types of packages or articles, and also enclosed spaces or containers, gaseous hydrogen peroxide ($H_2O_2$) can be used, which is mixed with air in the space or chamber. If air is taken from a normal environment, it also contains water vapour, the quantity of which can vary considerably. As a 100% liquid, hydrogen peroxide is a strongly reacting, i.e. oxidizing agent, which, due to the impact of temperature and especially heating, degrades relatively easily to water ($H_2O$) and oxygen ($O_2$). Certain metals (such as manganese dioxide) and impurities have an accelerating impact on the reaction speed of hydrogen peroxide, when again some acids, for example, citric acid, can be added into $H_2O_2$ as an inhibiting stabilising agent. The disinfecting and also bleaching feature of $H_2O_2$ comes from that as $H_2O_2$ degrades, highly reactive free oxygen atoms are formed. The $H_2O_2$ content of the aqueous solution of $H_2O_2$ in industrial applications is mostly 35% or 50%. Hydrogen peroxide can be produced, for example, with the so-called Riedl-Pfleiderer process.

One known technical way to decontaminate a space is simply to spray diluted hydrogen peroxide solution directly to the space or articles to be decontaminated. The decontamination effect remains inevitably very uneven, and it is difficult to avoid the condensation of hydrogen peroxide, i.e. accumulation on the surfaces in a liquid form, which again has a corrosive effect on such a surface, let alone the risk of explosion.

In the known technology, Cleamix Oy has an existing patent application FI 20187118 "Cleamix 1"), which presents a disinfecting method and device for the living and moving environments of people and animals and applied to the growth and storage environments of both people and animals. Application sites associated with medicine and the food industry are especially mentioned. In Cleamix 1, a container, pumps and a draining element are used, through which the $H_2O_2$ solution is directed to a draining device. This again drains the liquid to an evaporating surface, which simultaneously functions as a heating device.

In other words, an aqueous $H_2O_2$ solution (typically in a concentration of 50%) is directed from a nozzle to an inclined (1-30 degrees from the horizontal plane) plate, along which it flows downwards and, simultaneously, the solution is vaporized to gas by the heating device located below. The upper evaporation surface can be adjusted in every direction to the "correct" position by means of a horizontal plane indicator. Cleamix 1 also contains air blowers, in which air is made to flow both above and below the vaporizer plate. Strong gaseous hydrogen peroxide is thus directed to the space to be decontaminated. The structure of Cleamix 1 in the transport state is a briefcase-type device, and in the form of an opened briefcase in the state of use. The vaporizer element can be braided fibreglass, and there can be a net made of metal wire on top of it. Negative pressure can be adjusted in the interior of the device frame by using a separate valve.

A problem with Cleamix 1 of known technology is that the aqueous $H_2O_2$ solution drained from the draining device begins to flow along a lowermost point on the plate processed planar, because the surface is in practice not quite even. In practice, "a river" is formed on the surface, travelling across the surface from the upper edge of the inclined surface to the lower edge too fast in order for the liquid to have time to vaporize on its travel. Strong $H_2O_2$ solution thus flows to the lower edge of the plate, which is not advantageous or safe for the operation. The quantity of $H_2O_2$ evaporating from the plate to the upper edge of the evaporation plate with a small delivery volume of the nozzle is again very small, which is not sufficient for functional disinfection.

U.S. Pat. No. 7,713,473 ("Kendall") introduces a solution comprising a sterilization system and an associated vaporizer. This is a enclosed cabinet-type solution, for example, for medical supplies to be sterilized. Kendall uses pure 100 percent hydrogen peroxide, and heating and negative pressure produce a very high $H_2O_2$ concentration in the chamber volume. In FIG. 10 of Kendall there is illustrated a cut-away view of an outlet condenser/liquefaction unit, and FIG. 11 illustrates the same for a respective inlet unit. Between these parts there is the actual disinfecting chamber "200". In FIG. 10, gas is condensed into a liquid, and gas is directed to a torturous path so that it is in contact with baffles. The temperature of the outer walls and baffles can be controlled to enhance condensation. The outlet chamber of FIG. 10 can also be used so that the vaporized mixture of hydrogen peroxide, air and water vapour is directed to a section 216, in which part of the water condenses and is directed out through a pump 214. Part of the hydrogen peroxide condenses in the section 216, and the condensing liquid solution is more concentrated because of the exhausting water. In this case, the walls and baffles in FIG. 10 can be reheated so that the concentrated hydrogen peroxide solution is gasified and directed back to the decontamination chamber 200. This makes possible a more intensive sterilization than usually. A pipe 242 in FIG. 11 is an inlet pipe for the hydrogen peroxide solution in a liquid form, and this liquid vaporizes through the heating of the walls and baffles and the vapour flows upwards along a torturous path to the outlet 244, from where the gas goes to the decontamination chamber 200. Concentrated hydrogen peroxide vapour, like a gas with "normal concentration" always affects in an enclosed space, i.e. enclosed chamber 200. It is not directed, for example, to a bigger room space.

Kendall's FIG. 23 again illustrates an exemplary vaporizer in a perspective view. Here the hydrogen peroxide solution comes as a liquid from a pipe 514 to a space, the lower surface of which is formed by a surface 508, 510 in form of a slight ridge roof. Kendall mentions that a solution can be drained onto the ridge from the pipe 514. There can be more draining points but apparently, they are always directly on top of the middle ridge. The angle between the faces is preferably 25 . . . 50 degrees. The surface may be textured or grooved, and vertically oriented grooves are mentioned as a preferable application. The surface can have small pocket points, where the liquid flows as a small volume. The surface can also have protrusions; for example, a hemispherical form is mentioned to increase the area. Further, the "ridge roof formation" onto evaporation surfaces can be replaced with a vertical conical surface, pyramid surface or a hemispherical form (upper half), where a nozzle (i.e. end of the pipe 514) is placed directly above the middle of this section to achieve an even flow to the surface or surfaces.

The part of the solution overflowing to the bottom of the sloping face is in Kendall not collected to any end pit, cavity, or container. In connection with FIG. 23, an overflowing solution is not referred to, but the even distribution of the liquid is only made possible to the sloping faces so that there is more of the evaporating liquid surface. This requires, however, several draining points and vertically grooved surfaces 508, 510 for the liquid.

A problem with Kendall is that the structure does not function in a free space but in a small and enclosed sterilisation chamber, in which there is a highly concentrated hydrogen peroxide vapour acting on the outer surfaces of the article to be decontaminated. The evaporation surface 508 of the vaporizer has not been optimized so that the supply of the liquid is simplified and the area for the vaporization can in reality be maximized. Likewise, Kendall does not take a stand on the liquid drained through across the surface to down below and the risk caused by it in the device. The Kendall device is further not as such suitable for disinfecting, for example, hospital rooms due to the concentration of the hydrogen peroxide and air mixture. Further, the Kendall device with its pumps, valves and several pipe structures, is a too complex and expensive solution.

SUMMARY

In the present invention, one started to solve the problems presented above especially in Cleamix 1, and at the same time, the problems mentioned in connection with Kendall will be solved in a new way.

In other words, the present invention relates to an improved vaporizer element, i.e. evaporator element of a disinfecting device for an aqueous solution of hydrogen peroxide $H_2O_2$. The invention is based on a product similar to Cleamix 1, in which the problems have been described above. For enhanced efficiency, the starting point is to intensify the operation of the element vaporizing the liquid solution. This is associated with the placement of heating elements, temperature, and the control of elements. On the other hand, this is associated with the maximising of the area of liquid containing the vaporizing surface so that hydrogen peroxide can be vaporized into gaseous form as efficiently as possible. The present invention introduces a mechanical solution for efficiently increasing the liquid surface. Further, the present invention combines an air flow supply with the evaporating hydrogen peroxide solution, and through this the mixing of concentrated $H_2O_2$ with air by heating and through this by speeded evaporation, and by means of the air flows the more concentrated gas containing hydrogen peroxide is directed to the actual space to be decontaminated, where the concentration is more diluted. In the invention, it is also important to ensure that no condensation of concentrated $H_2O_2$, i.e. condensation back to liquid does not occur on the surfaces along the outlet routes of the arrangement. These surfaces refer especially to the surfaces after the evaporator element (in the direction of travel of the air flow), which are or which can be in contact with concentrated hydrogen peroxide gas. If $H_2O_2$ in liquid form is accumulated to the surface, the worst case scenario is that it starts to corrode the surface in question (such as organic compounds) fast (does not necessarily concern plastics or metals, such as aluminium), and because of its decay sensibility, $H_2O_2$ very easily transforms into water and oxygen via even an explosive reaction. Even through reaction products are typical harmless substances in the nature, the intensity of the reaction itself creates a risk for the product surfaces and surfaces of the space to be decontaminated. Therefore, the aim is to restrain the condensation effect in every possible way.

The air flow generated by the blower directs the gaseous, concentrated hydrogen peroxide-air solution into the enclosed interior to be disinfected, where it kills microbes, viruses and other impurities. In the principle of the invention it is essential that the mixture of hydrogen peroxide and air is not saturated, i.e. it does not condensate as liquid onto the surfaces where it could be of danger, for example, because of its explosion sensitivity. Because the water content of air, i.e. its humidity percentage varies in different atmospheres and even in interior premises, saturation (and through this condensation) can occur already with low $H_2O_2$ contents, if the air is very humid. The invention takes these issues into account in an additional example related to heating.

In the present invention, there is a plate to the upper end of which hydrogen peroxide solution can be drained, and the place contains a meandering groove, in which the main directions of the grooves are in the right and left, when viewing the element in the longitudinal direction. The meandering groove is symmetrical in relation to the middle axis and in practice, it covers the entire upper surface of the plate so that the evaporating area for the liquid is maximal. The groove depth is preferably selected so that also capillary effect is generated so that the area of the upper surface of the liquid solution grows even more. The liquid flowing over the entire length of the groove (if liquid is flowing to the end of the groove) eventually flows to the pit for overflowing liquid in the lower edge of the plate, in an embodiment of the invention. The plate dimensions are 20.4 cm*8.5 cm*3 cm, in one embodiment of the invention.

According to its first aspect, the present invention illustrates an evaporator element (10) for evaporating a liquid containing hydrogen peroxide to a desired, enclosed air volume. The evaporator element (10) is characterised in that the evaporator element (10) comprises thermally conductive material, the evaporator element (10) comprises at least one heating element (13),
the heat of which can be directed to the upper surface of the evaporator element (10),
the evaporator element (10) comprises on its upper surface a meandering groove (11) with one or several branches for a liquid containing hydrogen peroxide, said groove (11) having a desired constant or varying width and depth, and in which the area covered by the groove (11), viewed directly from above, covers at least 50% of the entire area of the evaporator element (10) viewed directly from above, and in which
the evaporator element (10) can be placed either in an inclined angle or the bottom surface of the groove (11) is arranged with its plane falling along the path of the liquid so that the liquid containing hydrogen peroxide can be fed and drained to the starting point (14) of the groove at the first end of the evaporator element (10) as the liquid travels along the groove (11) towards the end point (15) of the groove at the opposite, second end of the evaporator element (10), the liquid spreading at least over a part of the groove (11) before evaporating so that the volume arranged open in the upper part of the groove (11) makes it possible for the vaporized air-gas mixture containing hydrogen peroxide to spread to the desired, enclosed air volume.

In an embodiment of the evaporator element of the invention, the supply of the liquid containing hydrogen peroxide to the evaporator element (10) is continuous, but it can be switched off in an event of fault.

In an embodiment of the evaporator element of the invention, the evaporator element (10) is an elongated element, in which the direct distance between the start point (14) and end point (15) is bigger than the width of the evaporator element (10).

In an embodiment of the evaporator element of the invention, there is arranged an air flow essentially in the direction of the upper surface of the evaporator element (10), essentially in the longitudinal direction of the evaporator element, which enhances the evaporation from the surface of the evaporator element (10) and intensifies the directing and diluting of the concentrated gaseous mixture of hydrogen peroxide and air to a desired, enclosed air volume.

In an embodiment of the evaporation element of the invention, the start point (14) of the groove (11), when in the use position on the evaporating element (10), is positioned 0.8-1.2 cm higher than the end point (11) of the groove (11) on the evaporation element (10), the width of the evaporation element (10) is 7.0-10.0 cm, and the length of the evaporation element (10) is 18.0-23.0 cm.

In an embodiment of the evaporator element of the invention, the width of the groove (119) of the evaporator element (10) is chosen to be a standard value of 3.5-4.5 mm and the depth is chosen to be a standard value of 3.5-4.5 mm.

In an embodiment of the evaporator element of the invention, the groove (11) of the evaporator element (10) is processed to have an essentially evenly descending bottom surface or descending stepwise in the direction of travel of the liquid.

In an embodiment of the evaporator element of the invention, the meandering groove (11) comprises straight sections in the transverse direction according to the shorter dimension of the evaporator element (10), the adjacent straight sections connecting to each other on a meander section turning 180 degrees near the edge on the longer dimension of the evaporator element (10), always alternating from one edge area to the other.

In an embodiment of the evaporator element of the invention, the groove (11) is divided, forming bifurcated wide loops, which connect to each other in monofurcated groove sections in the middle of the evaporator element (10), where the liquid flow travels alternately in one or two parallel branches of the groove (11) on the sloped evaporator element (10), spreading to a big part of the evaporator element (10) area before evaporating.

In an embodiment of the evaporator element of the invention, the evaporator element (10) comprises an end pit (12), where the part of the supplied liquid comprising hydrogen peroxide that reaches the end point (15) of the groove of the evaporator element travels.

In an embodiment of the evaporator element of the invention, an overflow guard comprising an electrode is placed at the bottom of the end pit (12), the overflow guard being arranged to measure the conductivity of electricity between the electrode and the second end of the evaporator element, using resistive measuring.

In an embodiment of the evaporator element of the invention, as the resistance measured by the overflow guard changes by at least a set change limit, the operation of the device is interrupted by cutting off the liquid supply to the evaporator plate (10), and/or by alerting the user either locally or over a data communications network.

In an embodiment of the evaporator element of the invention, the evaporator element (10) is aluminium, and heating elements (13) are used for adjusting the temperature of the liquid comprising hydrogen peroxide travelling in the groove (11) of the evaporator element (10) to 65 . . . 75 degrees.

According to a second aspect of the invention, the inventive idea also comprises a disinfecting device for evaporating a liquid comprising hydrogen peroxide to a desired, enclosed air volume. The disinfecting device is characterised in that it comprises:

a controller for controlling the disinfecting device,
a liquid container, which comprises an aqueous solution of hydrogen peroxide, in which the share of hydrogen peroxide can be selected between 5-50%,
an elongated evaporator element (10), to which liquid can be pumped or directed from the liquid container,
an air blower (23), the air flow of which can be directed essentially in the direction of the longer dimension of the evaporator element (10), essentially in the horizontal direction,
at least one inner surface of the disinfection device, which is or which can be in contact with gasified hydrogen peroxide after evaporation, and which is heated with an additional heating element so that the gasified hydrogen peroxide is prevented from condensing onto the at least one inner surface of the disinfection device on the travel path of the gas, and that
the elongated evaporator element (10) is according to the general form presented first in the above first aspect of the invention.

In an embodiment of the disinfecting device of the invention, the disinfecting device comprises an overflow guard, a signal light and/or sound source indicating an alarm, cut-off valve for the liquid supply, and coupling to a controller, via which the alarm of overflow can be given remotely to the user or manager of the disinfecting device.

In an embodiment of the disinfecting device of the invention, the disinfecting device comprises at least one sensor for measuring the hydrogen peroxide concentration in a desired place on at least one inner surface of the disinfecting device, and/or in an air volume to be decontaminated, the sensor or sensors having a coupling to the controller.

In an embodiment of the disinfecting device of the invention, at least one heating element (13) heating the evaporator element (10) has been arranged to provide heating power, where the upper surface of the evaporator element (10) reaches the desired temperature, which is between 70 and 90 degrees.

In an embodiment of the disinfecting device of the invention, an additional heating element is arranged to provide heating power, with which the inner surface or surfaces of the gasification space of the disinfecting device is heated above the known saturation point in a use situation.

In an embodiment of the disinfecting device of the invention, an air control element is located essentially in a transverse position in the path of the air flow caused by the air blower (23).

In an embodiment of the disinfecting device of the invention, the air control element is a lattice-type element comprising air apertures.

In an embodiment of the disinfecting device of the invention, the disinfecting device comprises at least one additional air blower, which can be placed in a desired, enclosed air volume separately from other parts of the disinfecting device itself, the at least one additional air blower receiving control from the controller, and in which the at least one additional air blower is arranged to mix the concentrated mixture of hydrogen peroxide and air with the other air volume so that the hydrogen peroxide concentration is made essentially even on different sides of the desired, enclosed air volume.

In an embodiment of the disinfecting device of the invention, the elongated evaporator element (10) and related functionalities are according to an embodiment alternative of the first aspect of the invention presented above.

SHORT DESCRIPTION OF THE DRAWINGS

Figure 2:
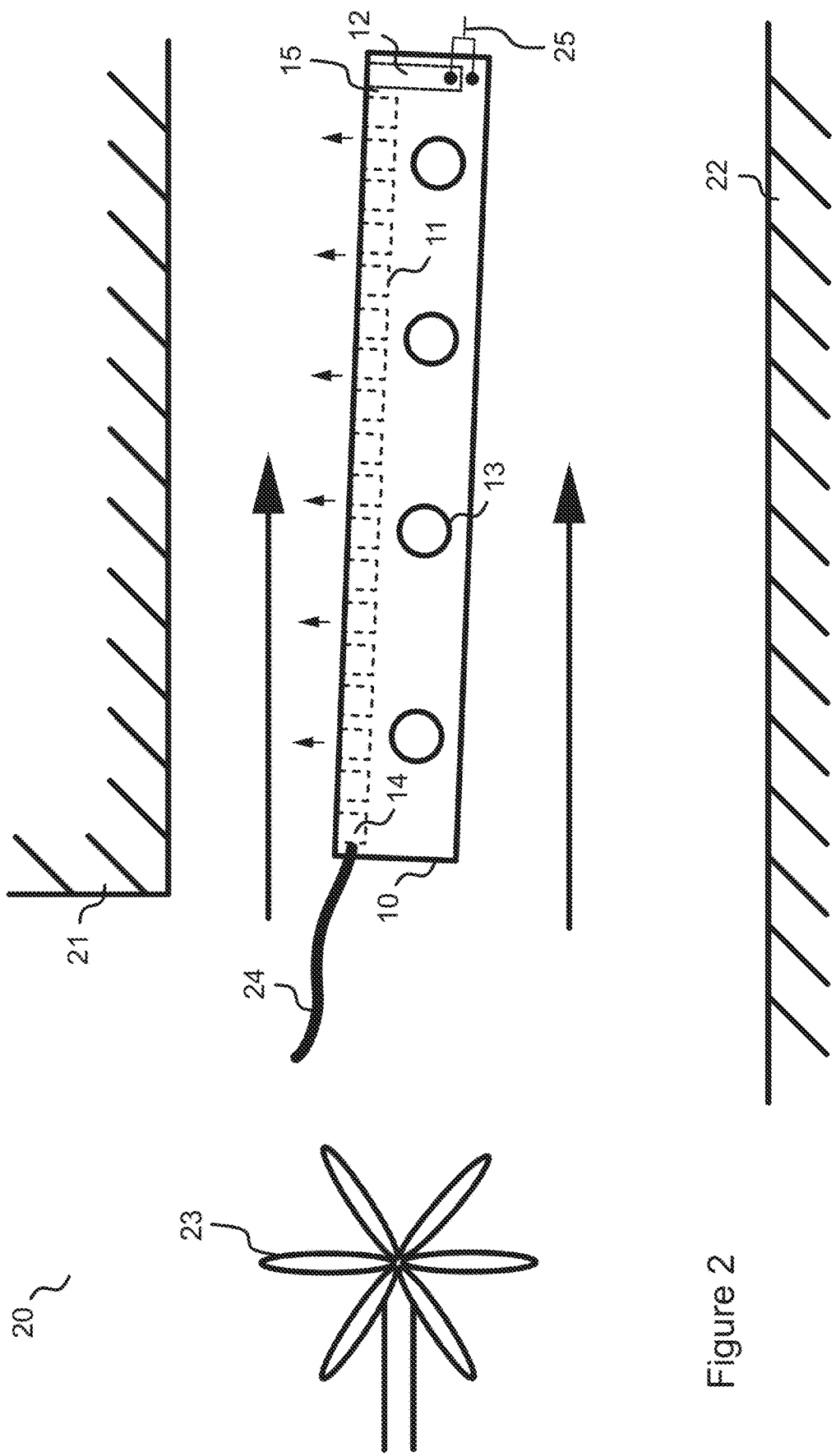
Figure 3:
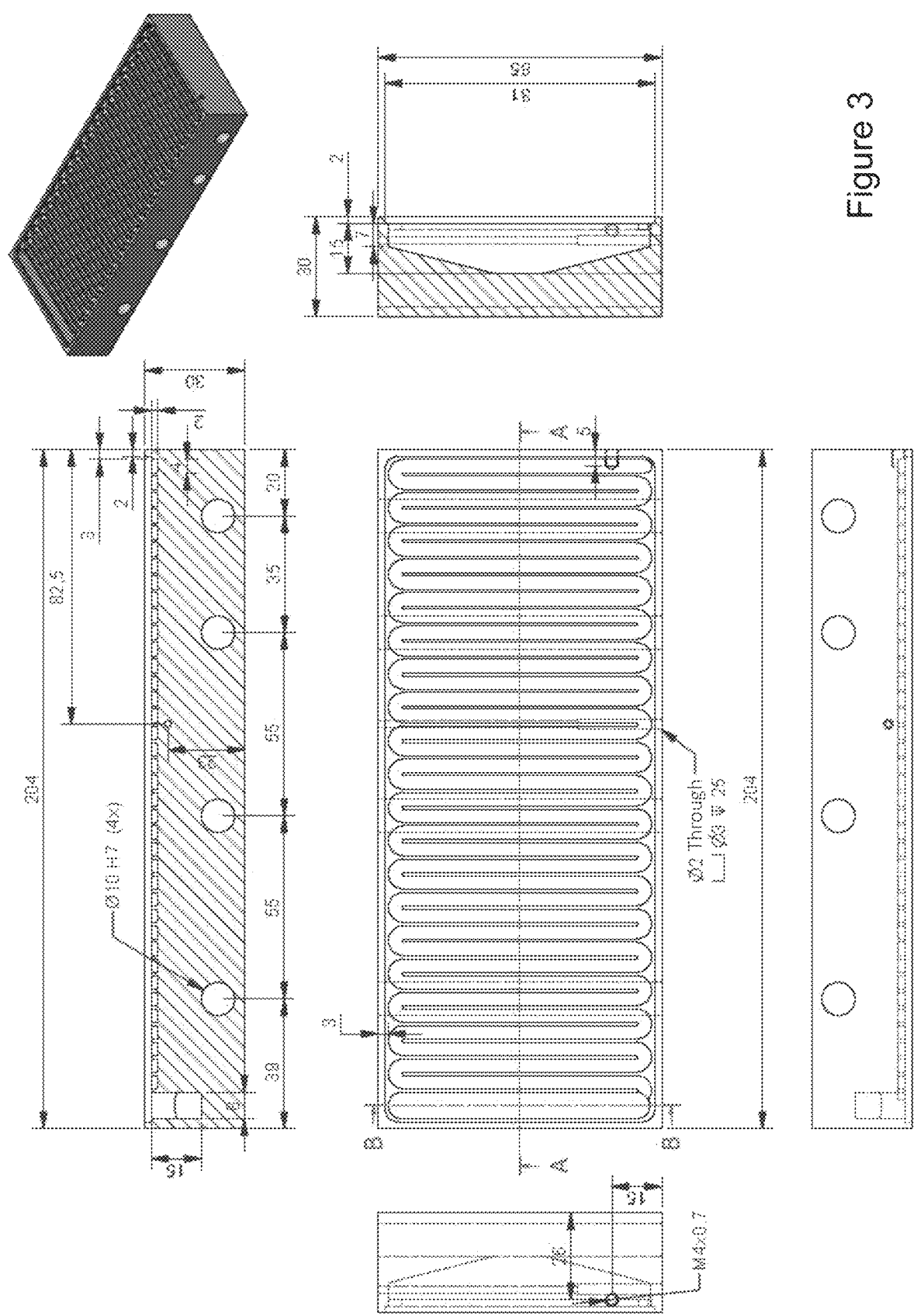

FIG. 1 illustrates a structure of the evaporator plate seen obliquely from above, FIG. 2 illustrates a structure of the disinfecting device seen directly from the side, and FIG. 3 illustrates an example of the evaporator plate of the invention from different sides, and with some exemplary measures.

DETAILED SPECIFICATION OF THE INVENTION

The present invention introduces an apparatus, which is suited for the killing of bacteria and viruses in inner premises of different sizes. In other words, this concerns a disinfecting device, in which a hydrogen peroxide solution ($H_2O_2$) of desired concentration is used as the decontamination agent. In the present invention, the essential mechanical element is a plate which makes evaporation possible, typically a metal plate or, for example, an aluminium plate, on the surface of which there has been processed a meandering path for the draining liquid. Other metals, such as stainless steel, can also be used as the evaporation plate in the invention. In this case, the liquid is in practice an aqueous solution of desired concentration of hydrogen peroxide. The grooved plate element is either processed directly to the plate with a prefabricated incline from the beginning to the end or, alternatively, the groove in the plate has been processed with an equal depth, and the plate can then afterwards be placed to an inclined position. As the result, the upper end of the groove is located higher than the lower end, thus enabling the gravitational draining of the liquid or liquid solution along the groove. In an advantageous embodiment, there is enough liquid (supply volume/time unit) so that the liquid stays in the groove during the entire travel and does not flood over the edges. If liquid flows through the entire length of the groove, an end container can be placed in the end of the groove, which can further be provided with an alarm device or sensor indicating the draining of the liquid all the way to the end container. This element can also be called a leak guard or overflow guard. The leak or overflow guard can be executed in several different technical ways.

In an embodiment of the invention, the plate making the evaporation possible is of the type illustrated in FIG. 1, presented as a perspective view obliquely from above. FIG. 1 illustrates a piece in the form of a rectangular prism processed from metal (i.e. an evaporator plate 10), with a groove 11 of even width processed onto its upper surface. In the illustrated example, the longitudinal measure of the metal element is given as 204 mm, i.e. 20.4 cm, and the transverse width as 85 mm, i.e. 8.5 cm, and the elevational measure as 30 mm, i.e. 3.0 cm, but these are only individual exemplary values. The plate dimensions can be chosen as desired according to the application object and the needed evaporation surface area without changing the inventive idea of the invention.

In an embodiment of the invention, the height of the groove made into the metal element is 4.0 mm and the width 4.0 mm, but this only represents one of the possible examples of the invention.

A groove according to the present invention is advantageously made as shaped in the Figure so that the biggest part of the groove consists of groove sections parallel with each other, directed transversely in the plate. In the points of the straight groove sections near the edge of the metal element, the groove turns 180 degrees, i.e. the groove travels in the direction of an arc of a semi-circle so that even in meander points the width of the groove is preferably equal to that in the straight sections. In the shown example, there are altogether 38 meanders, but even this is just one of the possible examples. The angle of inclination of the plate impacts the progress of the solution along the groove, and the element length and through this also the number of meanders can be chosen to be such that, with the desired delivery volume per time unit, it can be assumed that the liquid progresses along the groove so that the liquid is spread to a big part of the grooving made but, nevertheless, it would not reach the end pit, or that only a relatively small amount would proceed up to the end pit. Certainly, by manufacturing a longer element the area can be made bigger, and in all probability all liquid on the surface can then be evaporated before the liquid would reach the end pit. Even the heating efficiency from below or inside the evaporator element, close to the groove filled by the liquid, affects the intensity of evaporation and the length of the "draining distance" of the liquid. Irrespective of the relation of the chosen element length to its width, the end pit with its leak guard takes care of that the overflow liquid generates an alarm. Relating to the alarm, the system simultaneously cuts off the delivery of liquid to the evaporator plate, associated with the liquid arriving to the hydrogen peroxide solution or device. This can be done by switching off the operation of the pump, or by appropriate valve solutions.

In an example of the invention, the grooving of the evaporator plate can be executed as evenly descending. This means that if the groove itself is at a standard height all the way from the bottom of the plate and its upper edges, and the plate is placed in an inclined angular position to achieve a gravitational liquid flow, the direction of the groove's bottom edge (viewed from the cross-section) is the same all the time, i.e. in the cross-section, the groove bottom forms a straight, but obliquely positioned line. In a second example of the invention, the groove can be made descending in a stepwise manner, for example, in the manner of "fish steps" passing power plants, when searching a reference point from the nature. When viewing the cross-section, the bottom line of the groove thus forms stepped small platforms and points falling to the next step. These can be chosen with a desired frequency, for example, every few millimetres in the way of travel of the liquid. The liquid containing hydrogen peroxide supplied to the surface discharges along the groove, and a new liquid pushes the old liquid volume forwards so that the stepwise structure does not prevent the liquid from travelling on the element surface. With the stepwise application, the travelling speed of the liquid in the groove can be slowed down a little, but it is surely slightly more complicated to process to a horizontal metal plate.

A feature of the invention is that, for example, in a groove of 4 mm*4 mm, the mixture of hydrogen peroxide and water will rise up the edge of the groove to some extent, due to the capillary effect. The upper surface of the liquid will thus become more curved, which means, when viewing the surface on a small scale, a bigger evaporating surface of the liquid. This in its turn intensifies the generation of $H_2O_2$ gas, or the already generated gas becoming more concentrated. The groove must preferably be so high that the capillary effect becomes possible for the liquid flow containing $H_2O_2$ travelling in the groove. Grooves of other widths and depths can thus be used in the invention in addition to the groove with the measures 4 mm*4 mm.

As an additional example of the present invention there is a deeper volume at the end of the end container, i.e. grooving, i.e. in the lower edge during the use situation, into which the hydrogen peroxide solution that has entirely travelled through the grooving accumulates. This substance has thus not evaporated, even though evaporation is the purpose of the invention. The invention must thus have an indication method for overflowing liquid solution.

In the present invention, the overflowing liquid solution drains into the end pit 12, which in this example is of the shape in FIG. 1, with a slot-shaped pit deepening towards the centre at the one end of the metal element. The end pit is parallel to the main directions of the above-mentioned grooves 11, i.e. the end pit only sort of forms a recess deeper than the groove 11, where the hydrogen peroxide solution is accumulated if it doesn't have time to evaporate along the travel of the groove 11. In an example of the invention, a resistive leak guard is placed to the deepest point of the end pit 12, which can be executed, for example, by placing an electrode off the end plate to the bottom of the end pit. The conductivity between the electrode and end plate (i.e. frame) can be measured by resistance measuring. When liquid conducting electricity well comes between the electrode and frame, the conductivity improves compared to air so that the leak guard can immediately launch an alarm of a desired type. The needed quantity of liquid is very small and, in practice, the first drops falling to the bottom of the end pit 12 suffice to change the conductivity between the electrode and frame. The mechanism naturally requires that the measuring electrode is otherwise isolated from the frame, i.e. in the normal state, the resistance measuring goes "over the air area". The alarm signal, for its turn, can launch other actions, such as switching off the liquid supply pump, an alert message to the user, for example, to a smartphone and/or cutting off the power from the device.

In an example of the invention, the leak guard can have a capacitive operation principle. The operation principle of the leak guard can in other examples also be some other one, for example, a method based on a capacitive sensor, i.e. capacitive measuring. In the capacitive measuring, changes in dielectricity may be observed in the sensor identification area, and the change may be caused by another medium, such as an air-replacing aqueous solution containing hydrogen peroxide and arriving at the end pit. The change in dielectricity in the medium is seen in the electric field effective in this substance, and the capacitive sensor is able to measure this.

In the side surface of the evaporator element 10 in FIG. 1, there can be seen four aperture points. These are heating elements 13, which can be placed in the evaporator element 10 below the groove 11 for the liquid, for example, in an arrangement according to FIG. 1. The heating element can be either a cylindrical horizontal part transverse to the width dimension of the entire evaporator element 10, or the heating element can be placed symmetrically by the longitudinal central axis of the evaporator element to desired points as a part of a desired form. One horizontal passage drilled to the evaporator element can surely comprise also several parallel heating elements 13. Naturally, there are other possible ways of placing. The function of the heating elements 13 is to achieve a desired controllable temperature for the liquid volume area travelling in the groove. The surface temperature of the evaporator element 10 and, at the same time, that of the surface of the groove 11 to be brought to the temperature of approximately 70 degrees generates evaporation from hydrogen peroxide solution so that the result can be observed to be advantageous. In an advantageous situation the liquid evaporates efficiently from the evaporator element 10, and the input speed is nevertheless sufficient. Irrespective of this, liquid does not land to the end pit 12 in this evaporation temperature. Other evaporation temperatures can naturally be used, because in the invention even the strength of the hydrogen peroxide solution can vary. The boiling point of a 100% hydrogen peroxide solution on the sea level is 150.2°, but liquid always evaporates in the liquid form; the warmer the liquid (closer to its boiling point), the more liquid is gasified and mixed with the surrounding air. The same also goes to water and water vapour. An aqueous solution of a desired concentration of hydrogen peroxide is naturally used in the invention, i.e. its boiling point depends on the concentration of the liquid.

Other gaseous substances mixed with air effect the condensation synergistically. This means that in the situation of use of the invention gaseous hydrogen peroxide is mixed with gaseous air, and further air contains water vapour both originally and through gasified aqueous solution. If the relative humidity (water content) of the air is very high, a large content of $H_2O_2$ is not needed for the gas to become saturated. When the saturated gas "meets" new vaporized substance, such as $H_2O_2$, the substance does no longer stay in a gaseous state, but hydrogen peroxide (and water) is condensed onto the surfaces in a similar manner as water droplets accumulate on the outer surfaces of cool milk cartons in warm room premises. Liquid $H_2O_2$ reacts sensitively (decomposes through an intense reaction) and also corrodes its location surface, so therefore condensed $H_2O_2$ is a harmful by-product in the use situation of the device of the invention. It is desired to prevent condensation as a concentrated solution on the inner surfaces of the gasification space of the device and also on the surfaces of the room space to be disinfected and, because of this, at least one additional heating element is placed on the inner surfaces of the device, which keeps the temperature of the inner surface in question preferably somewhat higher than the temperature of incoming air. The inner surface of the gasification space thus refers to the surfaces in the interior of the device before the outlet pipe, which are in contact with the vaporized, i.e. gaseous air-hydrogen peroxide mixture, which is still highly concentrated in the device. In a use example, the inner surface of the device in danger of condensing is heated to a temperature, which is 10-60° C. higher than that of incoming air. This selected temperature is impacted by, in addition to the humidity of the air inside (water vapour content), also the concentration of gaseous hydrogen peroxide, i.e. content in the air. In other words, more physically defined, in one use example, the inner surface (or surfaces) of the gasification space of the device is heated above the known saturation point. The saturation point is thus a temperature limit, below which condensation begins to generate, and this is also impacted by the humidity content of air and the content of hydrogen peroxide. In the invention, the intensity of the blowing air (i.e. speed of the air flow) affects in practice the generation of the condensation effect. The effect is thus, generally speaking, the same in condensation and above-mentioned heating as in the above-mentioned milk carton example, compared to which liquid (i.e. water) is not condensed on the outer surfaces of warm food packages even in summer when keeping in normal room space, even though air were humid.

Next, we will describe an example of the environment of an evaporator element, taking into account also the desired air flows for the intensification and optimization of the function of the evaporator element. FIG. 2 illustrates a cross-section seen from the side of a disinfecting device. The disinfecting device 20 contains in this example an evaporator element 10, a supply pipe 24 for a liquid comprising hydrogen peroxide, an air blower 23, a lower base 22 of the device, and an upper surface 21 of the device. The evaporator element 10 of the device comprises, as in FIG. 1, a groove 11 for the liquid, heating elements 13, and an end pit 12 at the end point 15 of the liquid groove 11. The liquid supply pipe 24 is attached to the start point 14 of the liquid groove 11. In this example, the evaporator element 10 is an element in the form or a rectangular prism, on which the groove 11 has been prepared as a meandering groove with standard depth and even bottom; therefore, the evaporator element 10 is placed in a slightly oblique position so that the start point 14 of the groove is located slightly higher than the end point 15 of the groove. This makes it possible for the liquid to flow gravitationally along the groove without a special thrust generated by pumps. Naturally, the liquid flowing through the liquid supply pipe 24 can be supplied and controlled by a pump, but this is more a draining device bringing the liquid to the start point 14 of the groove than a pump driving the liquid forward in a pressurized manner. After the liquid has reached the surface of the evaporator element 10, the travel of the liquid is purely gravitational advancement, as in natural rivers.

At the bottom of the end pit 12 there is in this example placed an overflow guard 25, which comprises an electrode on the area of the inner volume of the end pit, quite close to the lowermost point of the pit but, nevertheless, electrically separately or isolated from the frame. The overflow guard is arranged to measure, for example, the electrical conductivity between the electrode and the other end (or element frame) of the evaporator element by resistive measuring. When the first drops of the aqueous solution of hydrogen peroxide fall to the end pit, this immediately changes the electrical conductivity between two electrodes, because the electrical conductivity of the liquid is different from that of air. Changed electrical conductivity also simultaneously means a changed electrical resistance between the electrodes. The overflow guard 25 (which has here been described only by a simplified coupling) detects this change and, on the basis of the change information, it can launch an alarm to the user either locally in the disinfecting device (sound and/or light) or, for example, remotely via software on a computer or, for example, through the user's smart phone, for example, via a tailored application. The overflow guard 25 is further advantageously arranged to cut off the supply of liquid in the liquid supply pipe 24 immediately when an alarm situation, i.e. liquid leaked to the end pit 12 has been detected.

The device 20 can contain a liquid container (not in the figure), which comprises an aqueous solution of hydrogen peroxide, in which the hydrogen peroxide content can be chosen between 5-50%. One preferable volume for the $H_2O_2$ content from the entire liquid is 50%, but also other contents can be chosen according to the situation and object of use. By means of a pump, liquid can be directed from the liquid container to the start point 14 of the groove 11 by the supply pipe 23.

On the left side of FIG. 2 there is an air blower 23, which is arranged to blow normal room air essentially in the direction of the longitudinal dimension of the evaporator element 10 essentially horizontally, or on the level of the surface of the evaporator element 10, or in the direction occurring between these directions. In practice, this means that the air blower 23 can be arranged to blow air both from above and below the evaporator element so that air can travel between the evaporator element 10 and the upper surface 21 of the device (from left to right in FIG. 2) and, when needed, also between the evaporator element 10 and the lower base 22 of the device. Because the bottom surface and evaporating surface of the evaporator element 10 are not exactly in a horizontal plane, but slightly inclined, and because the lower base 22 and upper surface 21 of the device can be in a horizontal plane or similarly inclined (the latter alternative is not shown in the figure) as the evaporator element 10, this may cause vortices in the air flow. Also, the groove 11 generates vortices to the air flow. The vortices are, however, advantageous for the present invention, because this way the gasified hydrogen peroxide solution as a concentrated mixture starts to flow in different directions from different points above the groove. The air blower 23, for its part, balances the concentration as the concentrated gas moves towards the outlet of the device. Here, there are different alternatives, in which the upper surface 21 and the lower base 22 of the device end in accordance with the air flow direction on the right side of FIG. 2 and the room space to be disinfected begins. One alternative is an outlet pipe or channel, with which the gaseous $H_2O_2$-air mixture is directed to a desired place in the room space to be disinfected. The disinfecting gas thus spreads in the room space forwards somewhat from the outlet channel, but to intensify the mixing, one or several additional air blowers are used in one example, which can be placed to different parts of the room space to be disinfected. It is naturally sensible to place the first additional air blower close to the outlet channel of the device in the direction of the air flow. This ensures the dilution of the more concentrated hydrogen peroxide gas and more even concentration to different sides of the space to be decontaminated from bacteria and viruses.

In an embodiment of the invention, an air control element (not in the figure) is placed essentially in a transverse position on the travel route of the air flow caused by the air blower 23. The air control element can be, for example, a lattice structure made of metal, such as sheet metal. The size (i.e. height and width) of the air control element can be chosen so that all air moving horizontally in accordance with FIG. 2 can be directed through the air control element. In one example, the height of the lattice is between 6-8 cm. The lattice structure can be a matrix-like structure with apertures, in which the measures of an individual aperture can be, for example, 1.5 cm*1.5 cm or, in a more general example, the horizontal and vertical side of the aperture can be between 1-2 cm. The apertures are arranged in horizontal and vertical rows. The air control element can be placed in a vertical position between the air blower 23 and evaporator element 10. The function of the air control element is to reduce or eliminate helical, i.e. turbulent air flow otherwise hitting the evaporator element 10 and change it to more laminar, i.e.

straight, non-turbulent flow. In this way, the air hitting the evaporator element 10 meets its entire surface more evenly, and in a desired longitudinal direction of the element (i.e. perpendicularly to the grooves) and, in this way, it evaporates more efficiently the hydrogen peroxide solution present on a wide area of the surface of the evaporator element 10. Likewise, the hydrogen peroxide-air mixture vaporized due to the smaller helicity of the air flow moving on the evaporator element 10 travels more efficiently out from the device with a certain air blower power. Because the air flow from the air blower 23 is typically helical and if there were no air control element, the air flow would guide the liquid at the worst case to the other edge of the evaporator element 10 in its groove. This is not preferable for the function of the device. When the air flow travels in the longitudinal direction of the evaporator element 10 on top of the surface of the evaporator element 10, it hits the grooves 11 on the evaporator element 10 essentially in a perpendicular direction, which is preferable for the operation of the device. The air control element thus changes the air flow meeting the evaporator element 10 from helical to essentially laminar. At the same time, the operation of the device associated with air flows and evaporation becomes better controllable, and also condensing can thus be prevented better.

In an embodiment of the invention, the outer surfaces of the outlet channel of the device (surfaces in contact with concentrated gas), the upper surface 21 in the device, and possibly even the lower base 22 in the device can be provided with an additional heating element/elements so that concentrated hydrogen peroxide solution will not condense back to liquid form on the inner surfaces of the gasification space of the device. This has been described already earlier. The running of the device can be controlled by a controller which also otherwise controls the device, and the relative humidity (i.e. water vapour content) of the input air of the air blower 23 can be taken into account. In an embodiment of the invention, each place of the inner surface of the device and also essential parts at the opening of the device's outlet channel, and on the outer surfaces have been heated so that the points of the surfaces in contact with concentrated hydrogen peroxide gas are heated to a temperature higher than the room temperature. Additional heating elements naturally need not be located in every place or part of the surface, because heat in aluminium or more generally in metal is well conducted, i.e. in the invention, additional heating elements can be at desired intervals in the vicinity of the surface of the device, in which case also the surfaces close to the elements and in the intermediate area are heated. The arrangement can also be provided with one or several temperature sensors to ensure the temperature value of the most critical exit surfaces (i.e. inner surfaces of the device's gasification space). A preferable temperature area on these surfaces is thus above the saturation point in the prevailing circumstances, so that no concentration occurs on these surfaces.

In the present invention, a general humidity sensor can be used, which measures the humidity content of air (water vapour and hydrogen peroxide together). Through calculation this sensor can also measure only the content of water vapour in air by disintegrating the hydrogen peroxide into its degradation products. The system thus observes the dewpoint, and in an embodiment of the invention, it is desired to work quite close to the dewpoint (slightly below it), but exceeding it is not desirable, to prevent the condensation effect.

In an example of the invention, plastics, such as PVC or HD polyethene can be used inside the disinfection device on surfaces with the danger of condensation of gaseous hydrogen peroxide. In another example of the invention, also these surfaces are, nevertheless, made of metal so that the heat of the additional heating elements heating the surfaces is well conducted onto these surfaces, and in this case no condensation occurs on these surfaces.

A disinfection device of the present invention can also be constructed so that the placing of the upper surface 21 and lower base 22 on opposite sides of the evaporation element 19 only exemplifies the transport situation of the disinfection device. The device can be, for example, a briefcase-type device, which in its situation of use can be opened and placed in the open position onto a desired surface, such as on a countertop or on the floor. In this case, the upper surface 21 does not limit the advancement of the vaporized hydrogen peroxide into its environment as a gas. The air blower 23 then creates vortices on the surface of the evaporation plate 10, which makes it possible for the hydrogen peroxide gas to spread to different sides, surely mainly in the direction of the airflow, but the gas partly spreads also upwards and to the sides (=in FIG. 2, also toward and away from the viewer).

In an embodiment of the invention, the inner bottom surface of the briefcase-type device in "wet space", i.e. in the volume impacted by liquid and vapour, is the lower base 22. In an embodiment, at least one extra leak guard has been placed to the lowermost point or points of this lower base 22 in its state of use. This leak guard detects, for example, by resistive measuring, if liquid is for some reason or another leaking or draining onto the lower base 22 of the device in the wet space during the use of the device. This may be caused, for example, by a wrong position of use of the device, an object thrown or dropped by mistake onto the briefcase, which blocks air flows from the air blower 23 to the surface of the evaporator element 10 or, for example, by errors in the operation of the liquid pump. The error may be, for example, that a signal has been given to cut off the supply of the liquid pump, but due to a fault in the pump or a controlling coupling, this does not occur physically in reality. In this case there is the danger that liquid leaks from the full end pit 12 over the edge of the entire evaporator element 10, and flows to the bottom of the device, i.e. the wet space. Liquid may also flow to the bottom of the wet space from elsewhere than the lower edge of the evaporator element 10 after the end pit 12 has filled up; such as, for example, due to faults in liquid supply pipes or valves or some other mechanical failure or obstacle or, for example, a fault associated with control signals. The controller is thus connected to extra leak guards, and the above-mentioned alarm arrangement is also connected to these extra leak guards. Flowing of the liquid to the bottom of the wet space for any reason is thus coupled to the alarm arrangement and related safety factors, such as cutting off the liquid supply. The arrangement thus improves the general safety of use of the device and minimises, for example, the explosion risk caused by the decomposition sensibility of hydrogen peroxide.

In one embodiment, a briefcase-type device nevertheless has in its use state an upper shield plate, i.e. the upper surface 21 can be in its place above the evaporator element 10 also in its use state. The purpose can be to protect against potentially splattering hydrogen peroxide solution, and also to direct air in the horizontal direction from the air blower to the side in the desired direction or to a pipe in the end part of the flow, the walls of which have been heated to prevent condensation. In one example, the upper surface 21 can be a transparent plate made of synthetic resin or plastic, such as a plate manufactured of PVC or (HD) polyethene.

In an embodiment of the invention, the air blower 23 is placed to the right edge of the figure in the case of FIG. 2, blowing air essentially horizontally from right to left. The air flow can travel from above the evaporator element 10, or both from above and below the evaporator element 10. The inclination and the liquid supply or start point 14 of the evaporator element 10 are in this example as in FIG. 2. This way the air flow generates slightly different vortices to the surface of the evaporator element 10. The device is in its use state either entirely open at the top, or open from its left and right edge (i.e. side ends) to make possible the travel of the air flow.

In an example of the invention, the average distance between the upper surface 21 and the upper edge of the evaporator element is between 5-15 millimetres. In another example, the evaporator element is positioned in the horizontal plane, the bottom of the groove 11, on the other hand, being descending either evenly or stepwise, and the distance between the upper surface 21 and the upper edge of the evaporator element is between 5-15 millimetres.

In an example of the invention, the average distance between the lower base 22 and the lower edge of the evaporator element is between 15-25 millimetres. In another example, the evaporator element has been positioned in the horizontal plane, the bottom of the groove 11, on the other hand, being descending either evenly or stepwise, and the distance between the lower base 22 and the lower edge of the evaporator element is between 15-25 millimetres.

Although one meandering groove 11 has been widely discussed above, in which horizontal groove sections have always been connected alternately in the vicinity of different side edges, it is also possible to position the surface of the groove 11 onto the evaporator element 10 in another way. In the invention, the area offered by the evaporator element 10 for the liquid is desired to be large in relation to the entire area of the element. Thus, the arrangement offers an effective evaporator. One alternative design of the groove 11 is a liquid flow "river" consisting of consecutive "islands", in which the groove starting from the centre is divided into two branches, advancing horizontally in opposite directions towards the edges of the evaporator element 10. After meanders of 180 degrees by the edges the two branches again travel directly towards each other, until they unite. Next there can be one further route for the united liquid flow in the centre of the plate, extending by the distance of the grooves, and after this, the groove may again branch off into two flows travelling directly to the side and after the meander into a uniting flow. The groove 11 of this type consists occasionally of one branch and occasionally of two branches. The arrangement requires of the position of the evaporator element 19 that it is laterally approximately straight (i.e. although the plate is downwards inclined, it must not be sideways inclined). This way the liquid is always divided into two branches in the division points of the groove 11, and the liquid spreads widely onto the surface of the evaporator element 10. After the last "loop", i.e. "island" limited by the liquid flow, the last joined branch of the groove 11 can be placed in the middle of the plate, which is directed to the end pit 12 of the end of the evaporator element 10.

FIG. 3 illustrates an example of an evaporator plate of the present invention viewed from different sides, and with some exemplary measures. The invention is, however, not meant to be limited to these measures only, but they mainly indicate the measures and dimensions used by an advantageous embodiment.

The parts and structure of the evaporator element according to FIG. 3 are similar to the structure already illustrated in FIG. 1. Uppermost on the left there is the evaporator element 10 viewed directly from the long side. The groove 11 is seen in its upper edge and, in this Figure, the inlet for the liquid, i.e. the start point 14 is up on the right, and the end pit 12 is the deeper pit seen close to the left edge of the element. In this example, the end pit 12 has been made 1.5 cm high and 8 mm wide, whereas the groove is 2 mm deep, and the upper level of the groove is still 2 mm lower than the upper edge of the entire evaporator element 10. The edge in question of the evaporator element 10 forms a 2 mm wide strip. The outermost edge of the meander of the meandering groove 11 extends in this example only as far as 1 mm from the edge strip of the evaporator element. In this example, the groove 11 is in itself wider than the "isthmus" between two adjacent straight groove sections. In one example, the isthmus can be only 1 or 2 mm wide. This way, the area covered by the liquid as it spreads on the groove 11 of the evaporator element 19 is over 50% of the entire area of 204 mm*85 mm, if assuming that the liquid extends over the entire groove from the start point 14 to the end point 15. In this connection it can be spoken for a potential evaporating surface but, naturally, the practical evaporation surface is defined according to how far on the groove 11 the supplied liquid advances. This is impacted by the angle of inclination of the evaporator element 10, but also by the volume of incoming liquid per time unit, and the temperature of the groove 11 generated by the heating elements 13. The capillary effect further increases the practical area separately for the liquid. The relative increase caused to the area by the capillary effect is a function of the groove width, i.e. the wider the groove, the smaller is the relative impact of the capillary effect on the increase of the liquid surface area.

On the top right in FIG. 3, the evaporator element 10 is illustrated from an oblique angle. It must be noted that the liquid supply point (start point 14) is now seen on the right edge of the evaporator element, and the end pit 12 is on the left edge in the element.

In the middle of FIG. 3 there is a view of the surface containing the groove 11, taken directly from above. The shape is similar to the shape of the groove already depicted in FIG. 1. This is, however, only one example of the layout of the groove 11.

The two end views outermost in the middle of FIG. 3 illustrate the smaller ends of the evaporator element 11, and here are shown especially the shape and dimensions of the pit 12 chosen to this example. The Figure does not show the electrode or wirings associated with the leak guard. The end pit 12 can also have a different shape from that shown in the Figure; it may be, for example, a vertically drilled hole of desired width right by the end point 15 or immediately after it. The leak guard with associated electrodes and couplings can be inserted to the bottom of such a vertical cylindrical pit.

The lowermost partial view in FIG. 3 is the opposite larger side wall of the evaporator element 10, seen from the side of the uppermost partial view, and it is principally seen as an upside-down image compared to the uppermost view.

The uppermost and lowermost views thus illustrate a longitudinal dimension according to line A, and the rightmost and leftmost views illustrate the transverse dimension according to line B of the evaporator element as cross-sectional views. The view on the top right illustrates the finished evaporator element depicted obliquely from above, in an example of the invention.

In an embodiment of the invention, the measures of the evaporator element 10 can be scaled from what is illustrated in FIG. 3, in which case also by adjusting the incoming liquid volume per time unit the device can be configurated to evaporate different quantities of hydrogen peroxide gas. Because the size of the room spaces to be disinfected may vary considerably, this makes it possible to scale the product to a magnitude which makes the $H_2O_2$ gas to distribute into a desired content in the entire volume to be decontaminated. Here it is naturally assumed that the additional air blowers achieve an even $H_2O_2$ concentration on different sides of the interior to be processed, i.e. for example, room volume.

The present invention thus comprises a controller, which is arranged to control the supply of incoming liquid, i.e. an associated pump, sensors, heating elements, additional heating elements, air blowers, additional air blowers and other measuring elements used, as well as an alarm system. The controller may also be located in a separate PC, which is coupled to the disinfecting device. The PC can also be located remotely. The arrangement can comprise a connection to a data network, or a separate receiver arrangement, in which measurements and control can be executed remotely, for example, in own premises of the manager or user of the disinfecting device on its own server or computer. The PC does not need to in the space to be disinfected or even in the next room.

One embodiment option is that the device is a briefcase-type device, and its control parameters can be given directly as briefcase device input, for example, by means of a separate keypad or keyboard. Similarly, the alarm may be shown directly on the outer casing of the device (light/LED), or as a sound-type alarm from a loudspeaker. The briefcase device can also be provided with a connection to a data network, and through this to an external PC or server.

The use of the invention comprise many types of interiors requiring disinfection, from which harmful bacteria or viruses are desired to be killed. Such premises are found in hospital environments, medical centres, clean rooms needed by university research, office premises, premises and test premises of companies operating in the medical field, public premises, and why not private ones, too. The object can generally speaking be any other enclosed interior, in which there is a reason to suspect the existence of pathogens on at least some surface or in the airspace of the room. The device of the invention can be installed in the room space, and after the use of the device the room space can be aired, and then the room space is clean from bacteria and viruses. In an embodiment of the invention, potassium permanganate can, when needed, be used for neutralising the effect of hydrogen peroxide impacting in air through a normal decomposition reaction, i.e. it works as a catalyst for this decomposition reaction and through this as a "decontaminator" of the disinfected space from hydrogen peroxide.

The disinfection of premises related to the corona virus can be mentioned as a topical special object of the invention; for example, the disinfection of hospital premises used by corona patients. In practice, disinfection can be done, after the corona patient has been transferred, in an empty room space having been occupied by the patient so that the exposure to corona infection of healthy people entering the room later can be made practically non-existent. An object of use can also be premises and routes intended especially for corona patients in medical centres and hospitals. Care facilities of nursing homes can also be disinfected with the device of the invention, as long as the room to be disinfected has been cleared of inhabitants/patients and personnel.

An advantage of the invention is that it offers an effective way of disinfection. Further, the invention is a safer method for disinfecting, because the apparatus of the invention does not allow the condensation of strong hydrogen peroxide liquid on any (inner) surface of a device, which is in contact with concentrated gas. Hydrogen peroxide as a substance is safe in the sense that its decomposition products, oxygen and water, are common agents in the nature, and downright necessary for human beings. Thus, no contaminants are generated during decomposition. An advantage of the device is also that it has an alarm system for liquid having leaked through the groove, and associated cut-off of liquid supply. This increases the safety of the use of the device. An advantage of the use of hydrogen peroxide is that the effects of the substance are well known, and it is already widely used in different disinfection needs and situations. An advantage of the invention compared to Kendall is that the efficient area of the evaporator element can be made very big, and this can be executed with one liquid supply, i.e. draining point. Thus, the invention remains sufficiently simple without compromising its functionality. Further, the invention allows the disinfection of a large room volume, such as hospital premises, unlike Kendall, which sterilizes objects with highly concentrated gas in a separate sterilizing chamber. The invention also takes into account the possibility of overflowing liquid with safety arrangements, unlike the Kendall solution. An advantage of the invention compared to Cleamix 1 is that, in the invention, the evaporating area on the liquid is considerably bigger than Cleamix 1 and, further, the solution of the invention takes the passing liquid into consideration in a considerably safer and more efficient way than the mere planar, sloped plate of Cleamix 1. In its functionality, the invention is considerably more stable, and it can be controlled better than the solution according to Cleamix 1.

The present invention is not limited only to the illustrated examples, but the scope of the invention is defined on the basis of the enclosed claims.

The invention claimed is:

1. An evaporator element for evaporation of a liquid comprising hydrogen peroxide to a desired enclosed air volume, comprising:
    heat conducting material,
    at least one heating element, heat of the heating element is conductable to an upper surface of the evaporator element,
    wherein
    the evaporator element comprises on its the upper surface one meandering groove comprising substantially straight and parallel sections for a liquid comprising hydrogen peroxide, the groove having a desired constant or varying width and depth, and an area of the groove seen directly from above covers at least 50% of the entire area of the evaporator element seen directly from above, and in which
    the evaporator element is adapted to be placed in an inclined angle or a bottom surface of the groove is arranged to be descending on a route of the liquid so that the liquid comprising hydrogen peroxide is fed and drained to a start point of the groove at a first end of the evaporator element as the liquid flows along the groove towards an end point of the groove at an opposite, second end of the evaporator element, the liquid spreading at least to a part of the groove before its evaporation, wherein a volume of the upper side of the groove, which is arranged open, enables a vaporized air-gas mixture comprising hydrogen peroxide to spread to the desired enclosed air volume.

2. An evaporator element according to claim 1 wherein a supply of the liquid comprising hydrogen peroxide to the evaporator element is constant, but switchable off in the event of fault situations.

3. An evaporator element according to claim 1, wherein the evaporator element is an elongated element, in which a direct distance between the start point and end point is bigger than a width of the evaporator element.

4. An evaporator element according to claim 1, wherein substantially in the direction of the upper surface of the evaporator element, substantially in a longitudinal direction of the evaporator element is arranged an air flow, which intensifies evaporation from the surface of the evaporator element, and intensifies control and dilution of concentrated gaseous hydrogen peroxide-air mixture to a desired enclosed air volume.

5. An evaporator element according to claim 1, wherein, in a position of use, the start point of the groove on the evaporator element is located 0.8-1.2 cm higher than the end point of the groove on the evaporator element, a width of the evaporator element is 7.0-10.0 cm and a length of the evaporator element is 18.0-23.0 cm.

6. An evaporator element according to claim 1, wherein a width of the groove of the evaporator element is chosen as a constant value between 3.5-4.5 mm and a depth is chosen as a constant value between 3.5-4.5 mm.

7. An evaporator element according to claim 1, wherein the groove of the evaporator element is processed with substantially steadily descending bottom surface, or descending stepwise in the direction of travel of the liquid.

8. An evaporator element according to claim 1, wherein the meandering groove comprises straight sections in a transverse direction according to a shorter dimension of the evaporator element, and adjacent sections join together on a meandering section turning 180 degrees near an edge on the longer dimension of the evaporator element, always alternately from one edge area to the other.

9. An evaporator element according to claim 1, wherein the evaporator element comprises an end pit, wherein a of the liquid comprising supplied hydrogen peroxide and reaching the end point of the groove flows.

10. An evaporator element according to claim 9, comprising an overflow guard at a bottom of the end pit, the overflow guard comprising an electrode, wherein the overflow guard is arranged to measure electrical conductivity between the electrode and one end of the evaporator element by resistive measuring, in which a result of the resistive measuring is conveyed to a controller controlling the supply of the liquid.

11. An evaporator element according to claim 10, wherein as the resistance measured by the overflow guard changes at least by a set change threshold value, operation of the device is interrupted by switching off the liquid supply to the evaporator plate, and/or by giving a user an alarm either locally or over a data communications network.

12. An evaporator element according to claim 1, wherein the evaporator element is aluminium, and heating elements adjust a temperature of the liquid comprising hydrogen peroxide flowing in the groove of the evaporator element to 65-75° C.

13. A disinfection device for evaporation of a liquid comprising hydrogen peroxide to a desired, enclosed air volume, the disinfection device comprising:

a controller for controlling the disinfection device,
a liquid container, which comprises an aqueous solution of hydrogen peroxide, in which content of hydrogen peroxide is selectable between 5-50%,
wherein the disinfection device further comprises:
an evaporator element, to which liquid is pumped or directed from the liquid container,
an air blower, the air flow of which is directable in a direction of a longer dimension of the evaporator element, substantially horizontally,
at least one inner surface of the disinfection device, which is or which may be in contact with gasified hydrogen peroxide after evaporation, has been heated using an additional heating element so that condensation of the gasified hydrogen peroxide on the at least one inner surface of the disinfection device in a route of the gas is prevented, and
the evaporator element comprising:
heat conducting material,
at least one heating element, heat of the heating element is conductable to an upper surface of the evaporator element,
wherein
the evaporator element comprises on the upper surface one meandering groove comprising substantially straight and parallel sections for a liquid comprising hydrogen peroxide, the groove having a desired constant or varying width and depth, and an area of the groove seen directly from above covers at least 50% of the entire area of the evaporator element seen directly from above, and in which
the evaporator element is adapted to be placed in an inclined angle or a bottom surface of the groove is arranged to be descending on a route of the liquid so that the liquid comprising hydrogen peroxide is fed and drained to a start point of the groove at a first end of the evaporator element as the liquid flows along the groove towards an end point of the groove at an opposite, second end of the evaporator element, the liquid spreading at least to a part of the groove before evaporation,
wherein a volume of the upper side of the groove, which is arranged open, enables a vaporized air-gas mixture comprising hydrogen peroxide to spread to a desired enclosed air volume.

14. A disinfection device according to claim 13, wherein the disinfection device comprises an overflow guard, a signal light and/or sound source indicating an alarm, a cut-off valve for the liquid supply, and a coupling to the controller, via which an alarm of overflow is given remotely to a user or manager of the disinfection device.

15. A disinfection device according to claim 13, wherein the disinfection device comprises at least one sensor for measuring hydrogen peroxide concentration at a desired place on the at least one inner surface of the disinfection device, and/or in the air volume to be decontaminated, the sensor or sensors having a coupling to the controller.

16. A disinfection device according to claim 13, wherein at least one heating element heating the evaporator element is arranged to provide heating power, in which the upper surface of the evaporator element reaches a desired temperature, which is between 70 and 90° C.

17. A disinfection device according to claim 13, wherein an additional heating element is arranged to provide heating power for heating an inner surface or surfaces of the gasification space of the disinfection device above a known saturation point in a situation of use.

18. A disinfection device according to claim 13, wherein an air control element is arranged substantially in a transverse position on the route of the air flow caused by the air blower.

19. A disinfection device according to claim 18, wherein the air control element is a lattice-type element comprising air travel apertures.

20. A disinfection device according to claim 13, wherein the disinfection device comprises at least one additional air blower, which is or which are placeable to a desired enclosed air volume separately from other parts of the disinfection device, the at least one additional air blower receives control from the controller, and the at least one additional air blower is arranged to mix a concentrated hydrogen peroxide-air mixture with the other air volume so that the hydrogen peroxide concentration is made substantially even on different sides of the desired enclosed air volume.

21. A disinfection device according to claim 13, wherein a supply of the liquid comprising hydrogen peroxide to the evaporator element is constant, but switchable off in the event of fault situations.

* * * * *